(12) United States Patent
Lim et al.

(10) Patent No.: US 7,508,429 B2
(45) Date of Patent: Mar. 24, 2009

(54) SOLID-STATE IMAGE-SENSING DEVICE FOR AVERAGING SUB-SAMPLED ANALOG SIGNALS AND METHOD OF DRIVING THE SAME

(75) Inventors: Su-hun Lim, Gyeonggi-do (KR); Tetsuo Asaba, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 847 days.

(21) Appl. No.: 11/157,461

(22) Filed: Jun. 21, 2005

(65) Prior Publication Data
US 2005/0280730 A1   Dec. 22, 2005

(30) Foreign Application Priority Data
Jun. 22, 2004   (KR)   ...................... 10-2004-0046569
Dec. 8, 2004    (KR)   ...................... 10-2004-0103097

(51) Int. Cl.
H04N 5/217   (2006.01)
H04N 3/14    (2006.01)
H04N 5/335   (2006.01)
H04N 9/04    (2006.01)
H04N 9/083   (2006.01)

(52) U.S. Cl. ........................ 348/241; 348/280; 348/300; 348/308

(58) Field of Classification Search ................. 348/241, 348/243, 272, 273, 280, 281, 300, 308; 250/208.1; 257/292
See application file for complete search history.

(56) References Cited

U.S. PATENT DOCUMENTS
6,476,864 B1   11/2002   Borg et al.

(Continued)

FOREIGN PATENT DOCUMENTS
JP   62-039982   2/1987

(Continued)

OTHER PUBLICATIONS
Notice to Submit Response in Korean Application No. 10-2004-0103097; Date of mailing; May 17, 2006.

(Continued)

*Primary Examiner*—Lin Ye
*Assistant Examiner*—Jason Whipkey
(74) *Attorney, Agent, or Firm*—Myers Bigel Sibley & Sajovec

(57) ABSTRACT

Provided are an improved solid-state image-sensing device for averaging sub-sampled analog signals and a method for driving the same. The solid-state image-sensing device receives a video signal from each pixel column and converts the video signal into a digital signal while a switch for averaging is turned off when the solid-state image-sensing device captures a still image. When the solid-state image-sensing device photographs a moving picture, one of two CDS circuits receives a signal corresponding to an average of video signals of columns having the same color pixel and converts the signal into a digital signal using the switch turned on.

28 Claims, 13 Drawing Sheets

U.S. PATENT DOCUMENTS

| | | | |
|---|---|---|---|
| 7,304,674 B2 * | 12/2007 | Mentzer et al. | 348/241 |
| 2002/0158982 A1 * | 10/2002 | Kokubun et al. | 348/308 |
| 2004/0246354 A1 * | 12/2004 | Yang et al. | 348/308 |
| 2005/0168251 A1 * | 8/2005 | Lim | 327/131 |
| 2005/0168601 A1 * | 8/2005 | Lim | 348/241 |
| 2005/0179795 A1 * | 8/2005 | Funatsu et al. | 348/241 |
| 2005/0206752 A1 * | 9/2005 | Lim | 348/241 |
| 2005/0285958 A1 * | 12/2005 | Matsuda | 348/300 |
| 2007/0024731 A1 * | 2/2007 | Muramatsu et al. | 348/308 |

FOREIGN PATENT DOCUMENTS

| | | |
|---|---|---|
| JP | 62-159995 | 7/1987 |
| JP | 2002-330349 | 11/2002 |
| KR | 1999-0030209 | 4/1999 |
| KR | 2002-0052185 | 7/2002 |
| KR | 2002-0083421 | 11/2002 |
| KR | 2003-0005292 | 1/2003 |

OTHER PUBLICATIONS

English translation of Notice to Submit Response in Korean Application No. 10-2004-0103097; Date of mailing May 17, 2006.

* cited by examiner

SOLID-STATE IMAGE-SENSING DEVICE FOR AVERAGING SUB-SAMPLED ANALOG SIGNALS AND METHOD OF DRIVING THE SAME

CROSS-REFERENCE TO RELATED APPLICATIONS

This application claims the priority of Korean Patent Application Nos. 10-2004-0046569 and 10-2004-0103097, filed on Jun. 22, 2004, and Dec. 8, 2004, respectively, in the Korean Intellectual Property Office, the disclosures of which are incorporated herein in their entirety by reference.

FIELD OF THE INVENTION

The present invention relates to solid-state image-sensing devices and methods of driving solid-state image-sensing devices.

BACKGROUND OF THE INVENTION

A solid-state image-sensing device is classified into a CIS type device and a charge-coupled device (CCD). Recently, the CIS type solid-state image-sensing device has replaced the CCD type solid-state image-sensing device and used in a variety of fields because the CIS type solid-state image-sensing device requires a operating voltage and consumption power lower than those of the CCD type solid-state image-sensing device and it is fabricated using a standard CMOS technology and easily integrated.

The CIS type solid-state image-sensing device is mounted in a cellular phone camera and a digital still camera, captures an image, converts the captured image into an electric signal and transmits the electric signal to a digital signal processor. The digital signal processor processes color image data RGB output from the solid-state image-sensing device to drive a display device such as a liquid crystal display (LCD).

In a system employing the CIS type solid-state image-sensing device, a sub-sampling mode of the solid-state image-sensing device outputs a video signal with a reduced vertical resolution. The sub-sampling mode supports a high frame rate in steps of requiring no high-resolution display, which include a moving picture displaying step, a preview step of confirming an image before capturing the image, and an automatic focusing step.

FIG. 1 is a block diagram of a conventional CIS type solid-state image-sensing device 100. Referring to FIG. 1, the conventional CIS type solid-state image-sensing device 100 includes an active pixel sensor (APS) array 110, a row driver 120 and an analog-digital conversion unit 130. The row driver 120 receives a control signal from a row decoder (not shown) and the analog-digital conversion unit 130 receives a control signal from a column decoder (not shown). The solid-state image-sensing device 100 further includes a controller (not shown) that generates timing control signals and addressing signals for outputting a selected and sensed video signal of each pixel. In the solid-state image-sensing device 100, in general, a color filter is arranged on each of pixels constructing the APS array 110 such that only light of a specific color is input to each pixel. To construct color signals, at least three kinks of color filters are arranged on the APS array 110. A general color filter array has Bayer pattern in which two red and green color patterns are arranged in one row and two green and blue color patterns are arranged in another row. Here, the green color pattern closed related to a luminance signal is arranged in all rows and the red and blue color patterns are alternately arranged in rows to improve luminance resolution. A CIS having more than one million pixels is applied to a digital still camera in order to improve resolution.

In the CIS type solid-state image-sensing device 100, the APS array 110 senses light using a photodiode and converts the sensed light into electric signals to generate video signals. The video signals output from the APS array 110 include red (R), green (G) and blue (B) analog signals. The analog-digital conversion unit 130 receives the analog video signals output from the APS array 110 and converts the analog video signals into digital signals.

In the conventional CIS type solid-state image-sensing device 100 shown in FIG. 1, the analog-digital conversion unit 130 converts a video signal sensed by the photodiode into a digital signal using a correlated double sampling (CDS) method, which is disclosed in U.S. Pat. No. 5,982,318 and No. 6,067,113. CDS analog-digital conversion is divided into two steps of receiving a reset signal from the APS array 110 and then receiving a video signal sensed by the photodiode to convert the video signal into a digital signal. Whenever the photodiode newly senses light at a predetermined period, the APS array 110 outputs the reset signal to the analog-digital conversion unit 130 before the photodiode outputs a newly sensed video signal to the analog-digital conversion unit 130. The analog-digital conversion unit 110 receives the reset signal to be reset, and then converts the video signal received from the photodiode into a digital signal. The digital signal is output to a digital signal processor and interpolated. The digital signal processor generates a driving signal suitable for resolution of a display device such as LCD to drive the display device.

When the CIS solid-state image-sensing device captures a still image, video signals of all pixels, sensed by photodiodes of the APS array 110 are output. In the sub-sampling mode, however, vertical resolution is reduced and video signals are output. In case of a CIS type solid-state image-sensing device having an APS array with super extended graphic adapter (SXGA) resolution, for example, the solid-state image-sensing device outputs SXGA-grade video signals when it photographs a still image. However, the solid-state image-sensing device outputs video graphic adapter (VGA)-grade video signals in sub-sampling mode operations including moving picture display, preview and automatic focus. For reference, the number of pixels of SXGA resolution is 1280*1024 and the number of pixels of VGA resolution is 640*480. Even a CIS type solid-state image-sensing device having an APS array with ultra extended graphics adapter (UXGA) resolution outputs video signals with less than VGA-grade resolution in the sub-sampling mode to reduce the quantity of processed data. For reference, the number of pixels of UXGA resolution is 1600*1200.

In the sub-sampling mode of the conventional CIS type solid-state image-sensing device 100, only video signals of a specific row and column are output to the analog-digital conversion unit 130 to reduce vertical resolution. To decrease the SXGA resolution to the VGA resolution, for instance, only a single data corresponding to the intersection of one row and column is selected from pixel data items corresponding to two rows and two columns and other data items are removed such that resolution is reduced by half. When only data corresponding to one row and column is selected from data items corresponding to many rows and columns, the resolution can be further reduced and thus the quantity of processed data can be further decreased.

However, there exits data that is not used but discarded in the sub-sampling mode of the conventional CIS type solid-state image-sensing device 100. This causes aliasing noise that oblique lines on a display are not smoothly connected but shown zigzag. To remove the aliasing noise, a method of averaging video signals in a predetermined range and outputting the averaged video signal has been proposed. The video signals averaging method includes a method of analog-averaging video signals in a predetermined range before video signals sensed by pixels are output to the analog-digital conversion unit 130, and a method of averaging corresponding digital signals output from the analog-digital conversion unit 130. However, digital averaging requires a large-capacity memory so that a chip area and power consumption are increased. Furthermore, to analog-average video signals sensed by pixels in the structure shown in FIG. 1, a single column requires two large capacitors for a reset signal and a video signal to result in an increase in the chip area. Accordingly, the solid-state image-sensing device is difficult to apply to small-size mobile apparatuses.

SUMMARY OF THE INVENTION

The present invention provides a solid-state image-sensing device which analog-averages video signals output from pixels without having a large capacitor to execute the sub-sampling mode operation for moving pictures to reduce a chip area and power consumption.

The present invention also provides a method of executing the sub-sampling mode operation of the solid-state image-sensing device.

According to an aspect of the present invention, there is provided a solid-state image-sensing device comprising an APS array, an averaging circuit, and a digital signal output circuit. The APS array has pixels arranged in a two-dimensional matrix. Two pixels in a selected row, which have a distance corresponding to one column between them, respectively generate a first reset signal and first video signal and a second reset signal and second video signal in a sub-sampling mode operation. The averaging circuit generates a signal in which an average of the first and second reset signals is reflected as an amplifier input signal, reflects the first and second video signals in the amplifier input signal to generate a signal corresponding to an average of a difference between the first reset signal and first video signal and a difference between the second reset signal and second video signal, and modulates the signal corresponding to the average into a pulse width signal in the sub-sampling mode operation. The digital signal output circuit generates a digital signal having different digital values based on instants of time of changing the logic state of the pulse width signal.

The averaging circuit comprises CDS circuits respectively having predetermined amplifiers, each of the CDS circuits being included each column, and a switch short-circuiting input ports of the amplifiers having a distance corresponding to one column between them in the sub-sampling mode operation. The amplifier input signal is generated at the short-circuited input ports. Only one of the CDS circuits, which has one of the amplifiers having a distance of one column between them, compares the signal corresponding to the average of the difference between the first reset signal and first video signal and the difference between the second reset signal and second video signal with a reference voltage to generate the pulse width signal.

The sub-sampling mode operation handles a moving picture. The switch is opened in a still image mode operation, and each of the CDS circuits generates a signal corresponding to a difference between a reset signal and a video signal generated from a corresponding pixel of the column in which the corresponding CDS circuit included and modulates the generated signal into a signal having a pulse width in proportion to a magnitude of the received signal in the still image mode operation. The pulse width signal is proportional to a magnitude of the signal corresponding to the average of the difference between the first reset signal and first video signal and the difference between the second reset signal and second video signal.

The APS array generates N reset signals and N video signals of columns having the same color in each of N rows. The averaging circuit respectively averages the N reset signals and N video signals and modulates a difference between the averaged reset signal and the averaged video signal into a pulse width signal.

The averaging circuit includes a first switch, a first CDS circuit, and a second CDS circuit. The first CDS circuit receives the reset signals and video signals from one column of the pixel array to generate a corresponding averaged reset signal and averaged video signal according to short-circuiting of the first switch and generates a first pulse width signal using a ramp signal, the averaged reset signal and the averaged video signal. The second CDS circuit receives the reset signals and video signals from a column, which is adjacent to the column to which the first CDS circuit belongs and has the same color as that of the column to which the first CDS circuit belongs, to generate a corresponding averaged reset signal and averaged video signal according to short-circuiting of the first switch and generates a second pulse width signal using the ramp signal, the averaged reset signal and the averaged video signal. The first switch is short-circuited in the sub-sampling mode operation.

The APS array further generates a third reset signal and third video signal and a fourth reset signal and fourth video signal from two pixels having a distance corresponding to one column between them, respectively, in the sub-sampling mode, and the averaging circuit reflects the third and fourth video signals in a corresponding amplifier input signal in which the third and fourth reset signals have been reflected to further generate a signal corresponding to an average of a difference between the third reset signal and third video signal and a difference between the fourth reset signal and fourth video signal and generates a pulse width signal corresponding to the generated signal. The first and second video signals correspond to a first color signal, and the third and fourth video signals correspond to a second color signal. The APS array generates the first and second video signals corresponding to the second color signal and generates the third and fourth video signals corresponding to a third color signal in a next selected row. The first, second and third color signals construct Bayer pattern.

According to another aspect of the present invention, there is provided a method for driving a solid-state image-sensing device comprising two pixels in a selected row, which have a distance corresponding to one column between them, respectively generating a first reset signal and first video signal and a second reset signal and second video signal in an APS array having pixels arranged in a two-dimensional matrix in a sub-sampling mode operation; reflecting the first and second video signals in an amplifier input signal in which the first and second reset signals have been reflected to generate a signal corresponding to an average of a difference between the first reset signal and first video signal and a difference between the second reset signal and second video signal, and modulating the signal corresponding to the average into a pulse width signal in the sub-sampling mode operation; and generating a digital signal having different digital values based on instants of time of changing the logic state of the pulse width signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
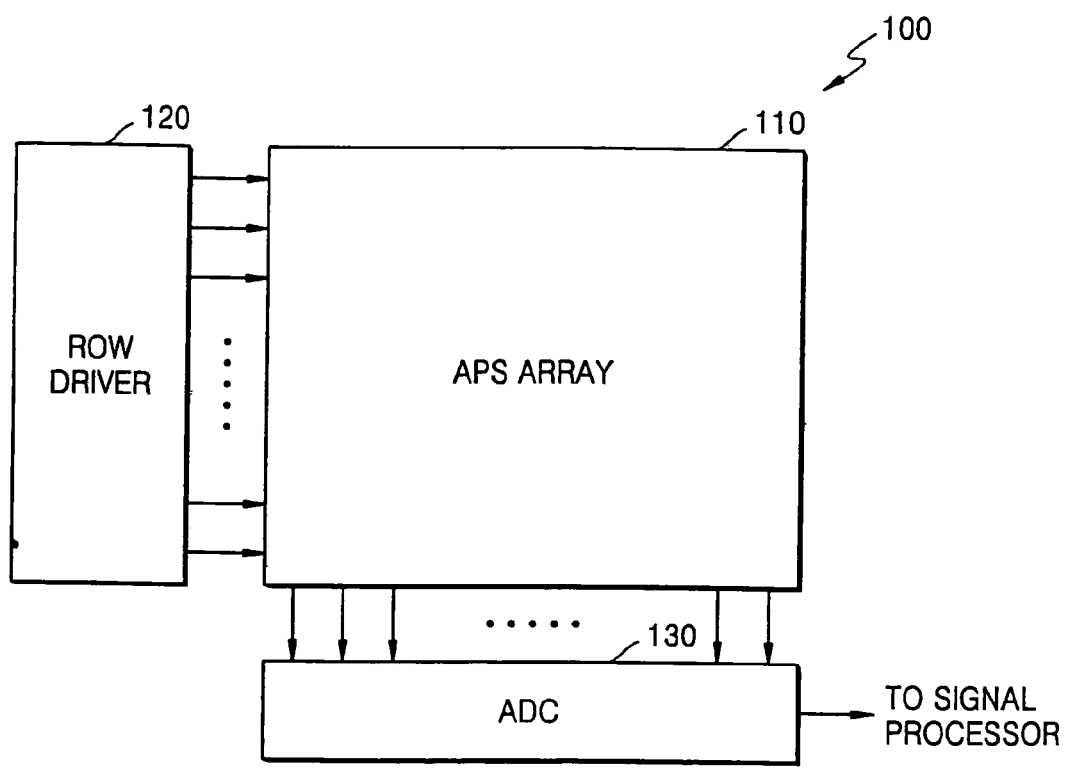
FIG. 1 is a block diagram of a conventional CIS type solid-state image-sensing device.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 2:
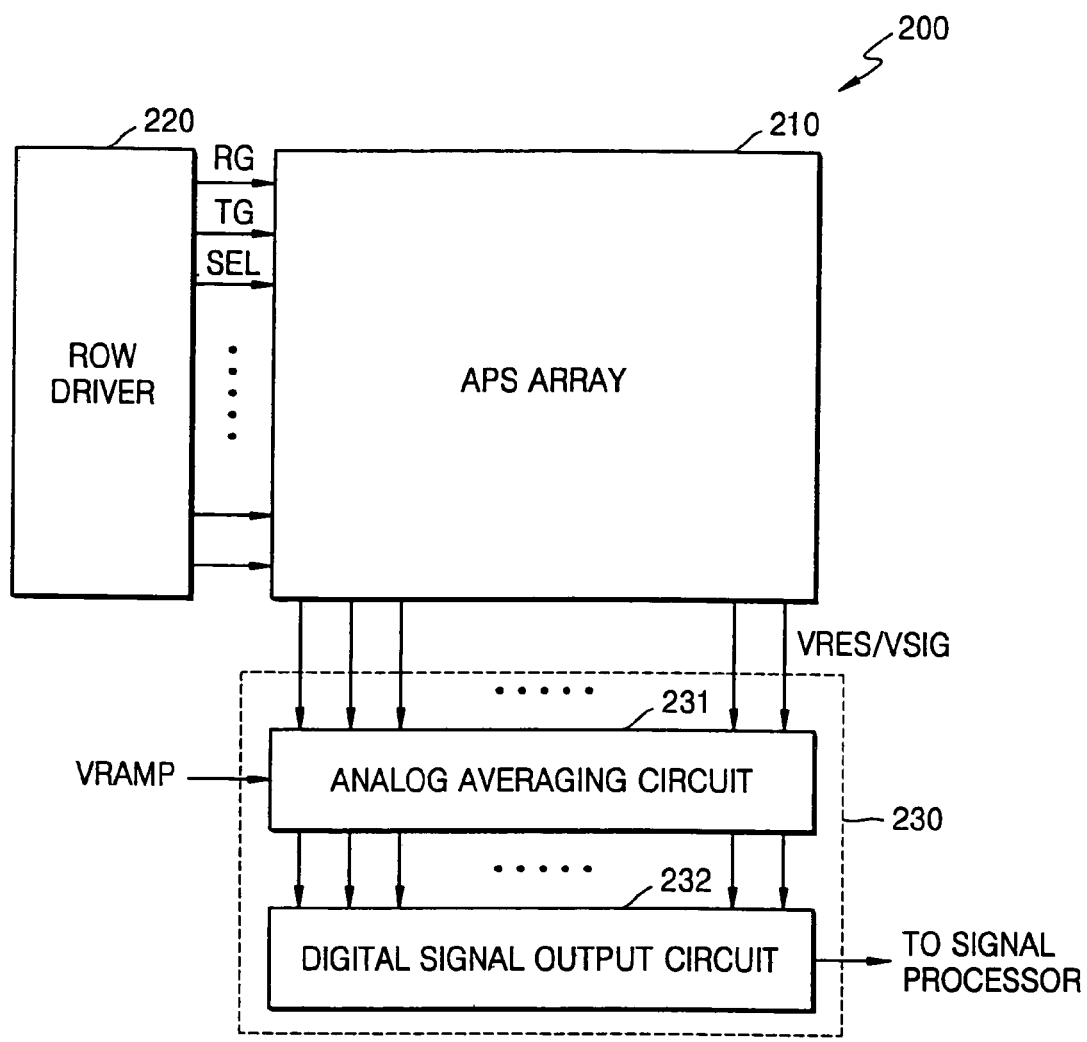
FIG. 2 is a block diagram of a CIS type solid-state image-sensing device according to an embodiment of the present invention.
Figure 3:
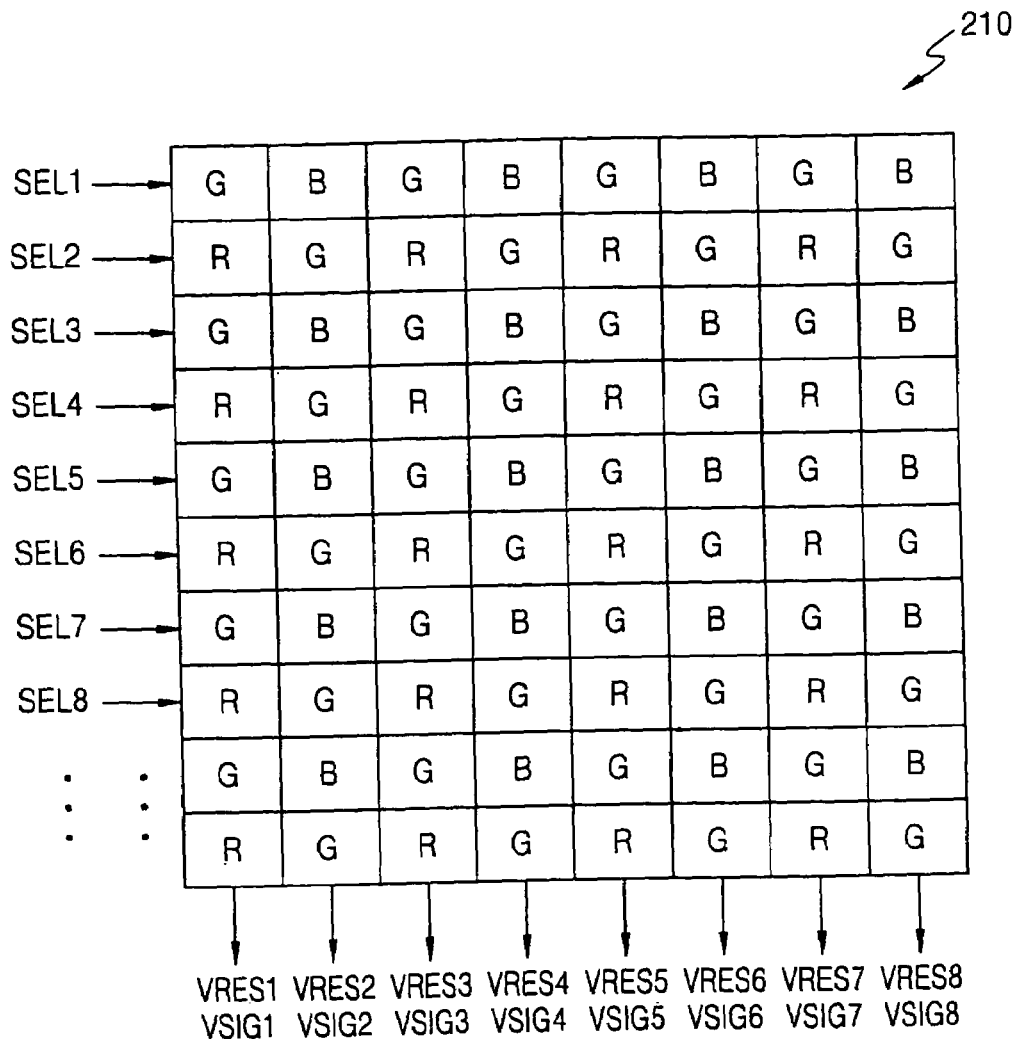
FIG. 3 illustrates the pixel structure of the APS array of FIG. 2.
Figure 4:
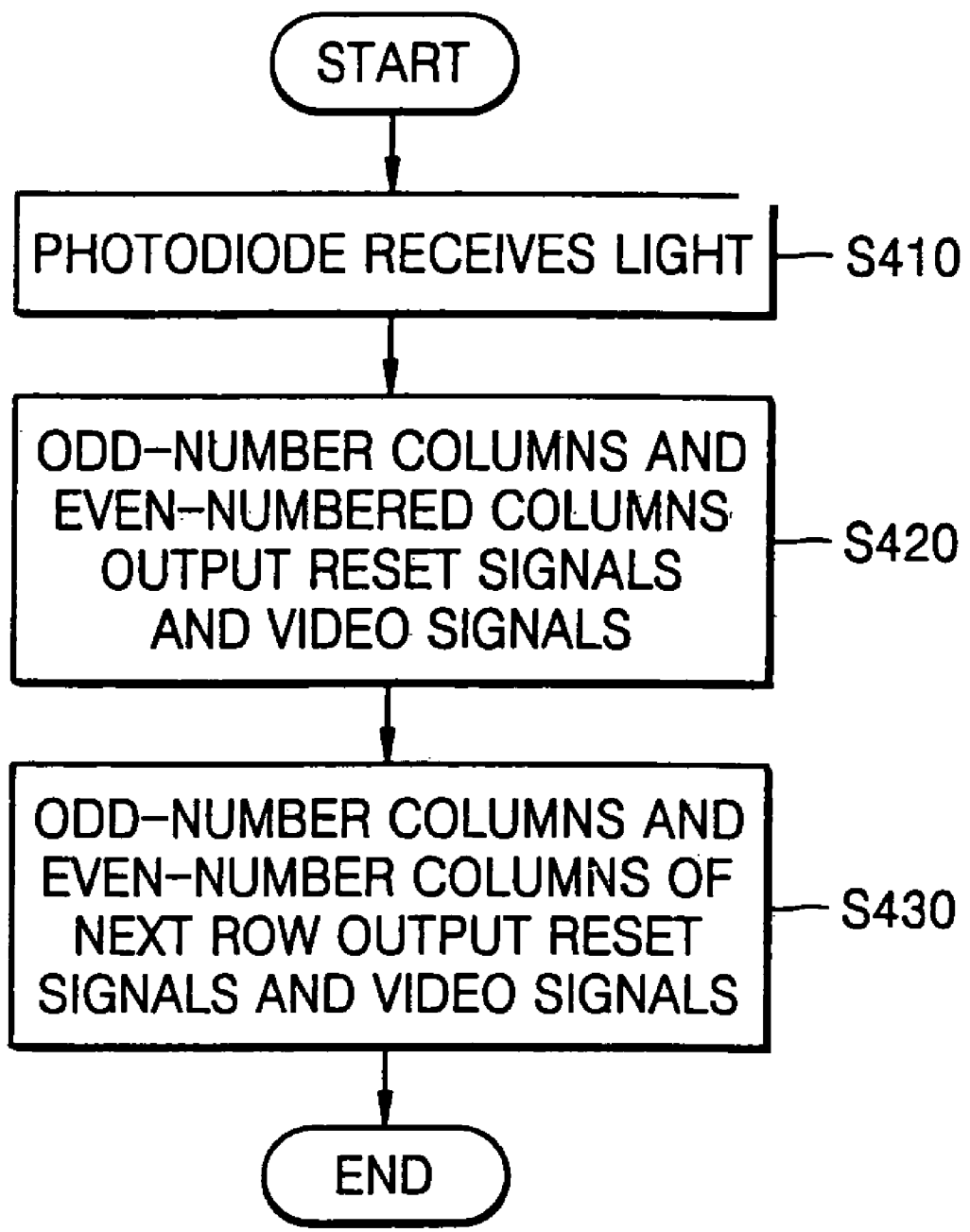
FIG. 4 is a flow chart for explaining the operation of the solid-state image-sensing device of FIG. 2.

FIG. 2 is a block diagram of a CIS type solid-state image-sensing device 200 according to an embodiment of the present invention, and FIG. 3 illustrates the pixel structure of the APS array of FIG. 2. FIG. 4 is a flow chart for explaining the operation of the solid-state image-sensing device of FIG. 2.

The solid-state image-sensing device 200 includes an APS array 210, a row driver 220 and an analog-digital conversion unit 230. The analog-digital conversion unit 230 includes an analog averaging circuit 231 and a digital signal output circuit 232.

The CIS type solid-state image-sensing device 200 is mounted in a cellular phone camera and a digital still camera, captures an image and converts the image into an electric signal to output the electric signal as a video signal. The solid-state image-sensing device 200 senses external light using photodiodes and converts the sensed external light into electric signals to output video signals. The photodiodes are respectively disposed at pixels arranged in a two-dimensional matrix in the APS array 210.

The solid-state image-sensing device 200 outputs reset signals VRES and video signals VSIG sensed by the photodiodes on the APS array 210 using a transfer control signal TG, a reset control signal RG and a row select signal SEL for selecting a row of the APS array 210, which are generated by the row driver 220. Three-color signals RGB output from the solid-state image-sensing device 200 are interpolated by a predetermined video signal processor (not shown) and then transmitted to a display device such as LCD to be displayed.

The CIS type solid-state image-sensing device 200 according to an embodiment of the present invention can analog-average the video signals VSIG output from the pixels to generate three-color signals RGB for a moving picture having no distortion without having a large capacitor in the sub-sampling mode for reducing vertical resolution.

As shown in FIG. 3, the APS array 210 is constructed in a manner that the pixels are arranged in a two-dimensional matrix. Assume that a color filter disposed on the APS array 210 has the Bayer pattern in which two color patterns of first and second color signals G and B are repeatedly arranged in one row and two color patterns of first and third signals G and R are repeatedly arranged in another row. However, the color filter is not limited to the Bayer pattern because the pixel array pattern can be constructed in various ways.

Figure 8:
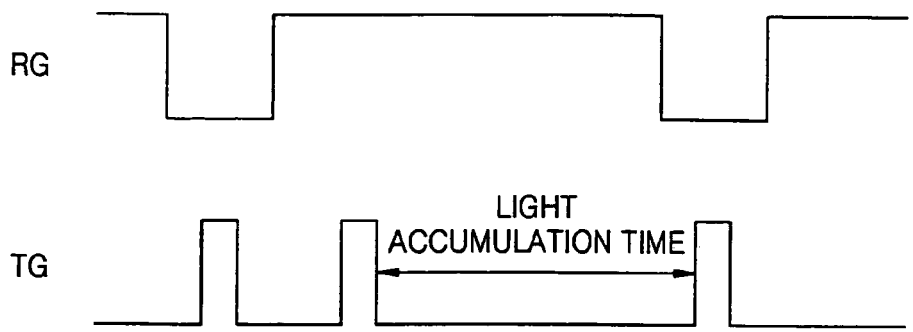
FIG. 8 is a diagram for explaining light accumulation time of a photodiode.

On the assumption that the color filter has the Bayer pattern, a mechanical shutter is opened to accumulate signal charges in photodiodes included in the APS array 210 for a predetermined period of time (referring to step S410 of FIG. 4). The quantity of signal charges accumulated in the photodiodes is decided according to the transfer control signal TG generated by the row driver 220, as shown in FIG. 8. While the signal charges are accumulated in the photodiodes, the APS array 210 generates and outputs the reset signals VRES in response to the reset control signal RG. The APS array 210 outputs the first color signal G and the second color signal B, photoelectric-converted by the photodiodes, from odd-numbered rows column by column and outputs the third color signal R and the first color signal G, photoelectric-converted by the photodiodes, from the even-numbered rows column by column in a still image mode. In the sub-sampling mode for a moving picture, two pixels (odd-numbered column pixels, for example) having a distance corresponding to one column between them in a selected row respectively generate and output a first reset signal VRES1 and first video signal VSIG1 and a second reset signal VRES3 and second video signal VSIG3 (referring to step S420 of FIG. 4). In addition, two pixels (even-numbered column pixels, for example) having a distance corresponding to one column between them respectively generate and output a third reset signal VRES2 and third video signal VSIG2 and a fourth reset signal VRES4 and fourth video signal VSIG4 (referring to step S420 of FIG. 4).

Referring to FIG. 3, when a row select signal "SEL1" for selecting the first row is activated in the sub-sampling mode, for example, the APS array 210 generates the first reset signal VRES1 and first video signal VSIG1 and the second reset signal VRES3 and second video signal VSIG3 respectively from the first and third column pixels for the first color signal G. In addition, the APS array 210 generates the third reset signal VRES2 and third video signal VSIG2 and the fourth reset signal VRES4 and fourth video signal VSIG4 respectively from the second and fourth column pixels for the second color signal B. The APS array 210 generates a corresponding reset signal and video signal from each pixel of other columns in the similar manner. Furthermore, the APS array 210 generates reset signals and video signals corresponding to the second color signal B and third color signal G in the similar manner (referring to step S430 of FIG. 4).

A case where the row select signal SEL1 for selecting the first row is activated and thus the APS array 210 generates the first reset signal VRES1 and first video signal VSIG1 and the second reset signal VRES3 and second video signal VSIG3 respectively from the first and third column pixels in the sub-sampling mode will now be explained. As described above, the same operation is carried out for other columns and other rows.

In the sub-sampling mode, the analog averaging circuit 231 generates a signal corresponding to an average of a difference VRES1-VSIG1 between the first reset signal and first video signal and a difference VRES3-VSIG3 between the second reset signal and second video signal using a fifth switch 510 (referring to FIG. 5), which short-circuits/opens between general CDS circuits, without having a large capacitor, and modulates the signal corresponding to the average into a pulse width signal. The digital signal output circuit 232 generates a digital signal having different digital values based on instants of time of changing the logic state of the pulse width signal. The analog averaging circuit 231 and the digital signal output circuit 232 will be described in more detail later.

Figure 5:
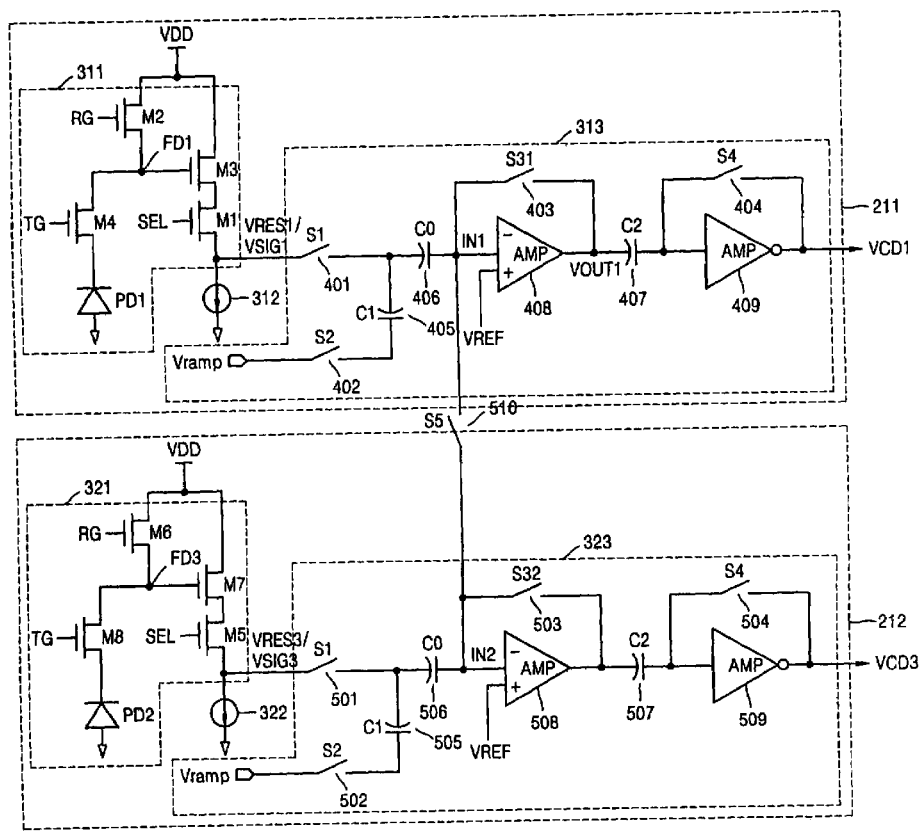
FIG. 5 is a circuit diagram of a pixel circuit and an analog averaging circuit.

FIG. 5 is a circuit diagram of a pixel circuit and the analog averaging circuit. FIG. 5 shows a circuit 211 for the first column, a circuit 212 for the third column and the fifth switch 510. While FIG. 5 shows the column circuits 211 and 212 for processing the first reset signal VRES1 and first video signal VSIG1 and the second reset signal VRES3 and second video signal VSIG3 when the first column and third column pixels respectively generate the first reset signal VRES1 and first video signal VSIG1 and the second reset signal VRES3 and second video signal VSIG3, column circuits for processing signals generated from other column pixels are operated in the same manner. The fifth switch 510 is located between odd-numbered columns and between even-numbered columns for the sub-sampling mode operation for moving pictures.

The circuit 211 for the first column includes a first pixel circuit 311 that will be selected in the first column, a predetermined current source 312 connected to all pixel circuits of the first column, and a first CDS circuit 313 processing the first reset signal VRES1 and first video signal VSIG1 output from the first pixel circuit 311. The circuit 212 for the third column includes a second pixel circuit 321 that will be selected in the third column, a predetermined current source 322 connected to all pixel circuits of the third column, and a second CDS circuit 323 processing the second reset signal VRES3 and second video signal VSIG3 output from the second pixel circuit 311. Here, the current sources 312 and 322 are respectively disposed at the ends of the first and third columns for all pixel circuits of the first and third columns, and the CDS circuits 313 and 323 and the fifth switch 510 are included in the averaging circuit 231. The operation of the circuits of FIG. 5 in the still image mode will be explained with reference to the timing diagram of FIG. 6 and the operation of the circuits of FIG. 5 in the moving picture mode will be explained with reference to the timing diagram of FIG. 7.

The pixel circuits 311 and 321 of the APS array 210 output the video signals VSIG1 and VSIG3, which are photoelectric-converted by photodiodes PD1 and PD2, from a row selected by row select signals SEL in response to the transfer control signal TG and generate the reset signals VRES1 and VRES3 in response to the reset control signal RG, respectively. Specifically, the first pixel circuit 311 includes four metal-oxide-semiconductor field effect transistors (MOSFETs) M1, M2, M3 and M4 and a single photodiode PD1. When a row select signal SEL is activated to a logic high state, the voltage of a node FD1, transmitted from a power supply, is output through the source of the MOSFET M3 serving as a source follower in response to the reset control signal RG. Then, the voltage of the node FD1 is output as the first reset signal VRES1 to the first CDS circuit 313 through the source of the MOSFET M1. When the transfer control signal TG is activated to a logic high state, the reset control signal RG is in a logic low state and the first video signal VSIG1 photoelectric-converted by the photodiode PD1 is output to the first CDS circuit 313 through the source of the MOSFET M1. Similarly, the second reset signal VRES3 and second video signal VSIG3 are output to the second CDS circuit 323 according to the second pixel circuit 321.

The operations of the first and second CDS circuits 313 and 323 in the still image mode will be now explained.

The first CDS circuit 313 included in the analog averaging circuit 231 sequentially receives the first reset signal VRES1 and first video signal VSIG1 to generate a signal corresponding to a difference between the first reset signal VRES1 and first video signal VSIG1 as an amplifier input signal VIN1. Then, the first CDS circuit 313 compares the amplifier input signal with a reference voltage VREF and outputs a signal VCD1 having a predetermined pulse width in response to the comparison result. The second CDS circuit 323 included in the analog averaging circuit 231 sequentially receives the second reset signal VRES3 and second video signal VSIG3 and generates a signal corresponding to a difference between the second reset signal VRES3 and second video signal VSIG3 as an amplifier input signal. Then, the second CDS circuit 323 compares the amplifier input signal with the reference voltage VREF and outputs a signal VCD2 having a pulse width different from the pulse width of the signal VCD1 in response to the comparison result.

The first CDS circuit 313 includes first, second, third and fourth switches 401, 402, 403 and 404, first, second and third capacitors 405, 406 and 407, and first and second amplifiers 408 and 409. In the still image mode, the fifth switch 510 is opened under the control of a signal S5 in an inactivated state (shown in FIG. 6). The first, second, third and fourth switches 401, 402, 403 and 404 respectively under the control of signals S1, S2, S31 and S4 are short-circuited and the first reset signal VRES1 is input to the first CDS circuit 313. Here, a voltage Vth1 (shown in FIG. 9) is generated at an input node IN1 of the first amplifier 408. When the first video signal VSIG1, photoelectric-converted by the photodiode PD1, is input to the first CDS circuit 313 in response to the transfer control signal TG, a voltage X1 (shown in FIG. 9) is generated at the input node IN1 of the first amplifier 408.

Figure 9:
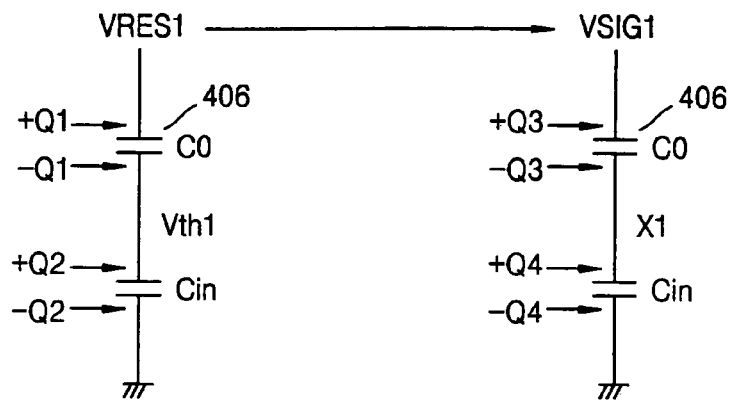
FIG. 9 illustrates a capacitor model for explaining outputs of the analog averaging circuit in the still image mode.

FIG. 9 illustrates a capacitor model when the first reset signal VRES1 is input (left side) and then first video signal VSIG1 is input (left side). Referring to FIG. 9, the following Equation 1 through Equation 6 are obtained.

$Q2-Q1=Q4-Q3$  [Equation 1]

$X1=Q4/Cin$  [Equation 2]

$Q1=(VRES1-Vth1)*C0$  [Equation 3]

$Q2=Vth1*Cin$  [Equation 4]

$Q3=(VSIG1-X)*C0$  [Equation 5]

$X=Vth1-(VRES1-VSIG1)*\{C0/(C0+Cin)\}$  [Equation 6]

Here, C0 denotes capacitance of the second capacitor 406 and Cin represents capacitance of the input node IN1 of the first amplifier 408. Q1 represent the quantity of charges of the second capacitor 405 when the first reset signal VRES1 is input and Q3 denotes the quantity of charges of the second capacitor 406 when the first video signal VSIG1 is input after the first reset signal VRES1 is input. Q2 represents the quantity of charges of the input node IN1 of the first amplifier 408 when the first reset signal VRES1 is input and Q4 denotes the quantity of charges of the input node IN1 of the first amplifier 408 when the first video signal VSIG1 is input after the first reset signal VRES1 is input. When C0 is sufficiently larger than Cin in Equation 6, Equation 6 approximates to Equation 7.

$$X = Vth1 - (VRES1 - VSIG1) \quad \text{[Equation 7]}$$

Figure 6:
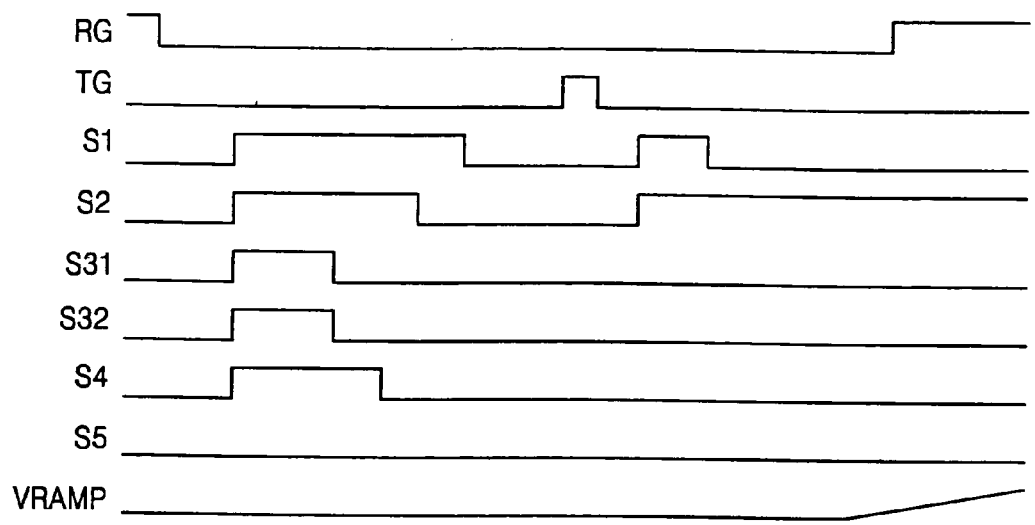
FIG. 6 is a timing diagram for explaining the operations of the circuits of FIG. 5 in a still image mode.

As shown in FIG. 6, when a ramp signal VRAMP is enabled to be gradually increased, the signal of the node IN1 corresponding to the difference between the first reset signal VRES1 and first video signal VSIG1 is also increased in response to the ramp signal VRAMP. The first amplifier 408 compares the increasing signal with the reference voltage VREF and outputs a signal VOUT1 with a predetermined pulse width in response to the comparison result. The second amplifier 409 receives and buffers the signal corresponding to the difference between the first reset signal VRES1 and first video signal VSIG1 transmitted through the third capacitor 407 and outputs the first pulse width signal VCD1. In the same manner, the second CDS circuit 323 receives the second reset signal VRES3 and second video signal VSIG3 to output the second pulse width signal VCD2.

Figure 7:
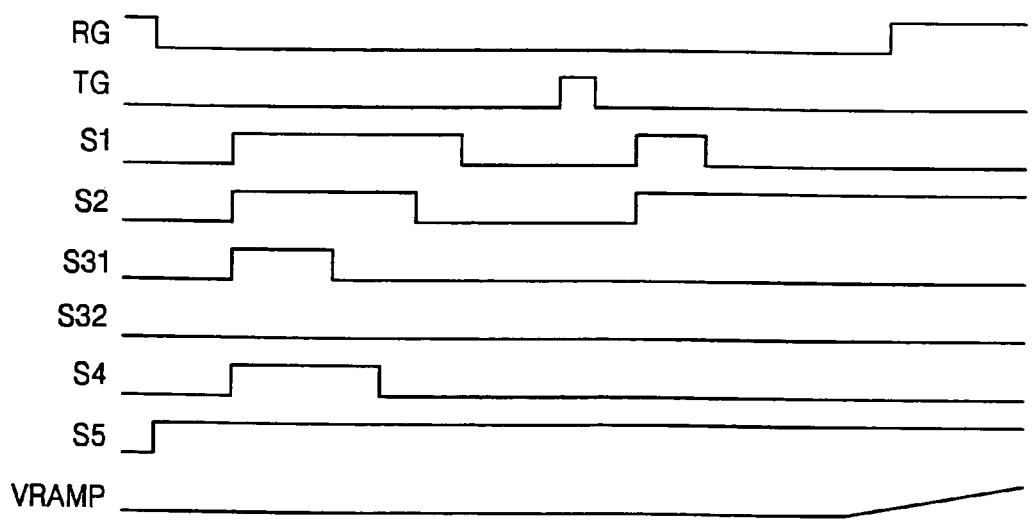
FIG. 7 is a timing diagram for explaining the operations of the circuits of FIG. 5 in a moving picture mode.

Referring to FIG. 7, in the sub-sampling mode for moving pictures, the fifth switch 510 is short-circuited under the control of the signal S5 in an activated state and the third switch 503 included in the second CDS circuit 323 is opened under the control of a signal S32 in an inactivated state. That is, in the sub-sampling mode, first and second amplifiers 508 and 509 included in the second CDS circuit 323 are not operated and the input node IN2 of the first amplifier 508 of the second CDS circuit 323 and the input node IN1 of the first amplifier 408 of the first CDS circuit 313 are short-circuited. In other words, the input ports IN1 and IN2 of the two amplifiers 408 and 508 having a distance corresponding to one column between them are short-circuited. In this state, the second CDS circuit 323 does not output the normal second pulse width signal VCD2 and only the first CDS circuit 313 normally outputs the first pulse width signal VCD1.

Averaging of video signals of two columns when the input nodes IN1 and IN2 of the amplifiers 408 and 508 are short-circuited in the sub-sampling mode will now be explained.

When the switches 401 and 501 of the first and second CDS circuits 313 and 323 are short-circuited, a signal corresponding to an average of the first and second reset signals VRES1 and VRES3 is generated at the input nodes IN1 and IN2 of the amplifiers 408 and 508 based on the first and second reset signals VRES1 and VRES3 input from the pixel circuits 311 and 321. Here, the voltage of the signal corresponding to the average of the first and second reset signals VRES1 and VRES3 is Vth2 (shown in FIG. 10). Subsequently, when the first and second video signals VSIG1 and VSIG3, photoelectric-converted by the photodiodes PD1 and PD2, are respectively input to the first and second CDS circuits 313 and 323 in response to the transfer control signal TG, a voltage X2 (shown in FIG. 10) is generated at the input node IN1 of the first amplifier 408 of the first CDS circuit 313. That is, the voltage X2 is obtained by reflecting the first and second video signals VSIG1 and VSIG3 in the amplifier input signal voltage Vth2 corresponding to the average of the first and second reset signals VRES1 and VRES3.

Figure 10:
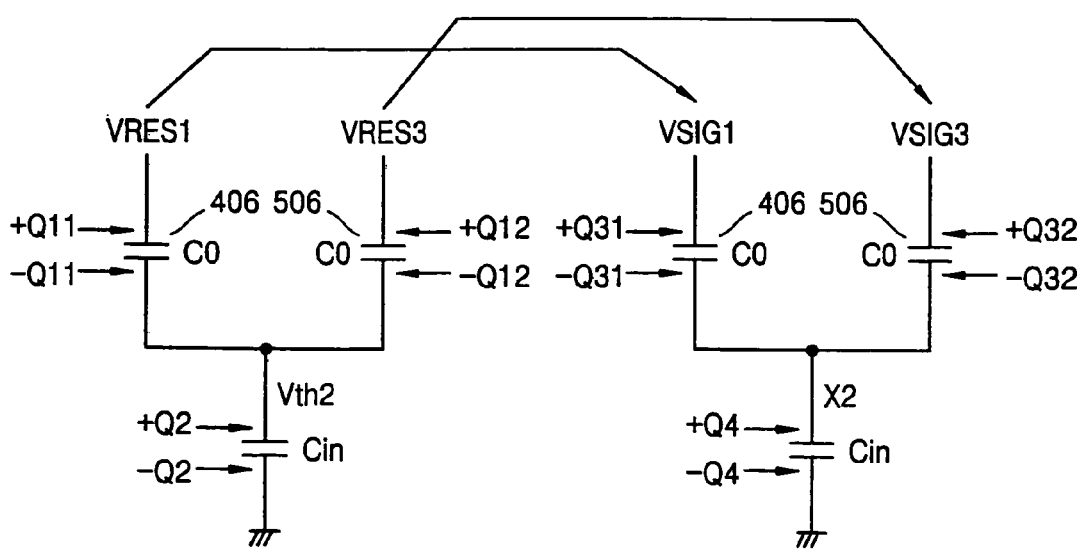
FIG. 10 illustrates a capacitor model for explaining outputs of the analog averaging circuit in the moving picture mode.

FIG. 10 illustrates a capacitor model when the reset signals VRES1 and VRES3 are input (left side) and then the video signals VSIG1 and VSIG3 are input (right side). Referring to FIG. 10, the following Equation 8 through Equation 15 are obtained.

$$Q2 - (Q11 - Q12) = Q4 - (Q31 + Q32) \quad \text{[Equation 8]}$$

$$Q11 = (VRES1 - Vth2) * C0 \quad \text{[Equation 9]}$$

$$Q12 = (VRES3 - Vth2) * C0 \quad \text{[Equation 10]}$$

$$Q2 = Vth2 * Cin \quad \text{[Equation 11]}$$

$$Q31 = (VSIG1 - X2) * C0 \quad \text{[Equation 12]}$$

$$Q32 = (VSIG3 - X2) * C0 \quad \text{[Equation 13]}$$

$$X2 = Q4/Cin \quad \text{[Equation 14]}$$

$$X2 = Vth2 - \{(VRES1 - VSIG1) + (VRES3 - VSIG3) * \{C0/(2*C0 + Cin)\} \quad \text{[Equation 15]}$$

Here, C0 denotes capacitance of the capacitors 405, 406, 505 and 506, and Cin represents capacitance of the input nodes of the amplifiers 408 and 508. Q11 represents the quantity of charges of the capacitor 406 when the first and second reset signals VRES1 and VRES3 are input and Q31 denotes the quantity of charges of the capacitor 406 when the first and second video signals VSIG1 and VSIG3 are input after the first and second reset signals VRES1 and VRES3 are input. In addition, Q12 denotes the quantity of charges of the capacitor 506 when the first and second reset signals VRES1 and VRES3 are input and Q32 represents the quantity of charges of the capacitor 506 when the first and second video signals VSIG1 and VSIG3 are input after the first and second reset signals VRES1 and VRES3 are input. Q2 represents the quantity of charges of the input node IN1 of the first amplifier 408 when the first and second reset signals VRES1 and VRES3 are input and Q4 denotes the quantity of charges of the input node IN1 of the first amplifier 408 when the first and second video signals VSIG1 and VSIG3 are input after the first and second reset signals VRES1 and VRES3 are input. When C0 is sufficiently larger than Cin in Equation 15, Equation 15 approximates to Equation 16.

$$X2 = Vth2 - \{(VRES1 - VSIG1) + (VRES3 - VSIG3)\}/2 \quad \text{[Equation 16]}$$

As described above, the first and second video signals VSIG1 and VSIG3 are reflected in the amplifier input signal voltage Vth2 in which the average of the first and second reset signals VRES1 and VRES3 have been reflected to generate an average {(VRES1−VSIG1)+(VRES3−VSIG3)}/2 of the difference (VRES1−VSIG1) between the first reset signal VRES1 and first video signal VSIG1 and the difference (VRES3−VSIG3) between the second reset signal VRES3 and second video signal VSIG3. Accordingly, the first amplifier 408 of the first CDS circuit 313 modulates the signal X2 of the input node IN1, which corresponds to the average, into a pulse width signal. When the signal X2 is generated at the input node IN1 of the first amplifier 408, the ramp signal VRAMP is enabled to be gradually increased as shown in FIG. 7 and the first amplifier 408 compares the signal VIN1 of the input node IN1, which is increased in response to the ramp signal VRAMP, with the reference voltage VREF to output the signal VOUT1 having a predetermined pulse width. The second amplifier 409 receives the signal VOUT1 transmitted through the third capacitor 407, buffers the signal VOUT1 and outputs the first pulse width signal VCD1. The pulse width of the first pulse width signal VCD1 is proportional to the magnitude of the signal X2 corresponding to the average of the difference between the first reset signal VRES1 and first video signal VSIG1 and the difference between the second reset signal VRES3 and second video signal VSIG3. As described above, the amplifiers 508 and 509 of the second CDS circuit 323 are not operated in the sub-sampling mode for moving pictures.

Figure 12:
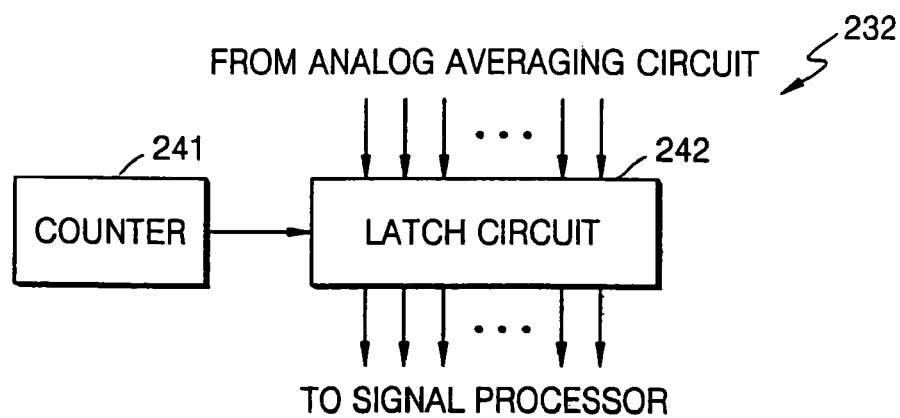
FIG. 12 is a block diagram of the digital signal output circuit of FIG. 2.

FIG. 12 is a block diagram of the digital signal output circuit 232 of FIG. 2. Referring to FIG. 12, the digital signal output circuit 232 includes a counter 241 and a latch circuit 242. The counter 241 starts counting when the ramp signal VRAM is increased and outputs a count value corresponding the moment of time when the logic state of the second amplifier output signal VCD1 is changed to the latch circuit 242. The latch circuit 242 stores the count value received from the counter 241 and outputs the count value.

As described above, in the CIS type solid-state image-sensing device 200 according to an embodiment of the present invention, the analog-digital conversion unit 230 receives a video signal from each pixel column and converts the video signal into a digital signal while the switch 510 for averaging is turned off when the solid-state image-sensing device 200 captures a still image. When the solid-state image-sensing device 200 photographs a moving picture, one of two CDS circuits included in the analog-digital conversion unit 230 receives a signal corresponding to an average of video signals of columns having the same color pixel and converts the signal into a digital signal using the switch turned on. Accordingly, the sub-sampling mode for reducing vertical resolution by ½, ⅓ and ¼ can be easily realized.

Figure 13:
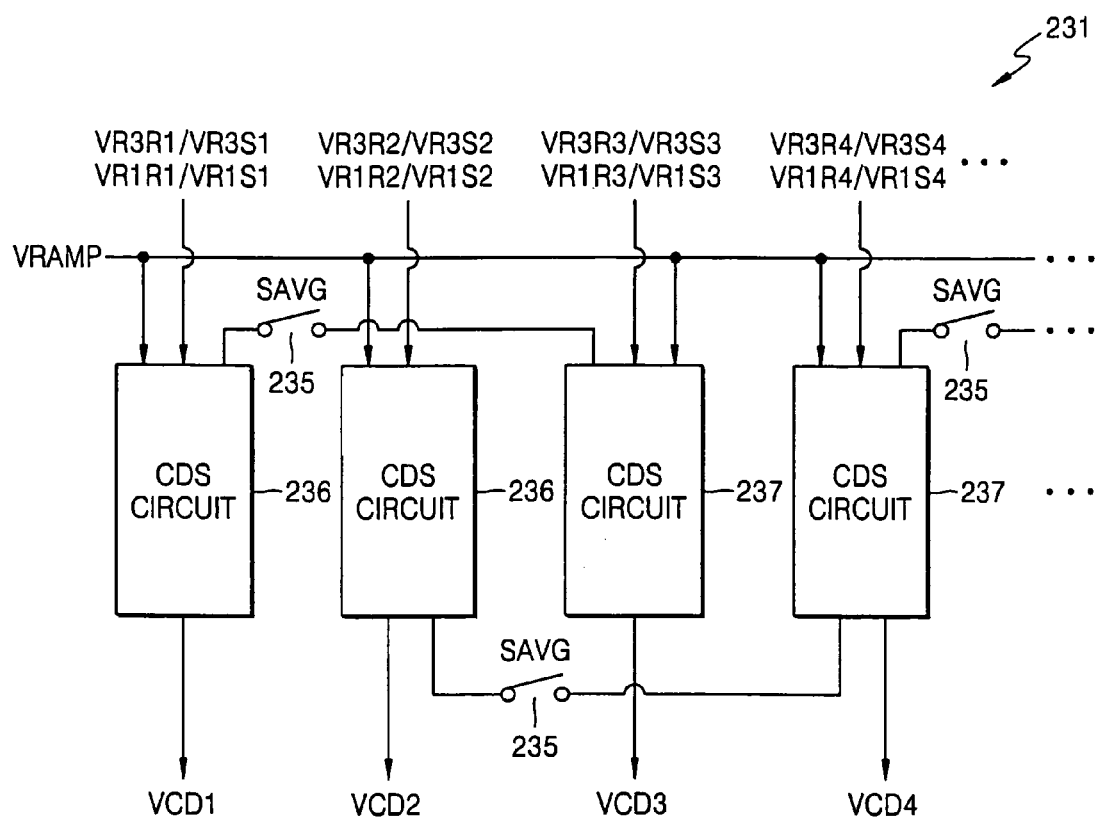
FIG. 13 is a block diagram of the analog averaging circuit of FIG. 2 according to another embodiment of the present invention.

FIG. 13 is a block diagram of the analog averaging circuit 231 of FIG. 2 according to another embodiment of the present invention. Here, the sub-sampling mode operation for reducing resolution by ½ is explained. The analog averaging circuit 231 of FIG. 13 averages reset signals VRES and video signals VSIG of two odd-numbered pixels and two even-numbered pixels column-by-column and row-by-row, respectively, in the sub-sampling mode. Referring to FIG. 13, the analog averaging circuit 231 includes a first switch 235, a first CDS circuit 236 and a second CDS circuit 237. The first CDS circuit 236 generates a first pulse width signal (VCD1, for example) from reset signals (VR1R1 and VR3R1 of the first and third rows, for example) and video signals (VR1S1 and VR3S1 of the first and third rows, for example) in a column (the first column, for example) of the APS array 210.

The second CDS circuit 237 generates a second pulse width signal (VCD3, for example) from reset signals (VR1R3 and VR3R3 of the first and third rows, for example) and video signals (VR1S3 and VR3S3 of the first and third rows, for example) in a column (the third column, for example) that is adjacent to the column to which the first CDS circuit 236 belongs and has the same color pixel as that of the column to which the first CDS circuit 236 belongs.

The first switch 235 is short-circuited in the sub-sampling mode for averaging but opened in the moving picture mode. In the sub-sampling mode operation, input reset signals and video signals are averaged according to short-circuiting of the first switch 235 and one of the first and second CDS circuits 236 and 237 normally generates the pulse width signal VCD1/VCD2. The short-circuiting and opening of the first switch 235 are controlled by a control signal SAVG generated by a controller (not shown).

Figure 14:
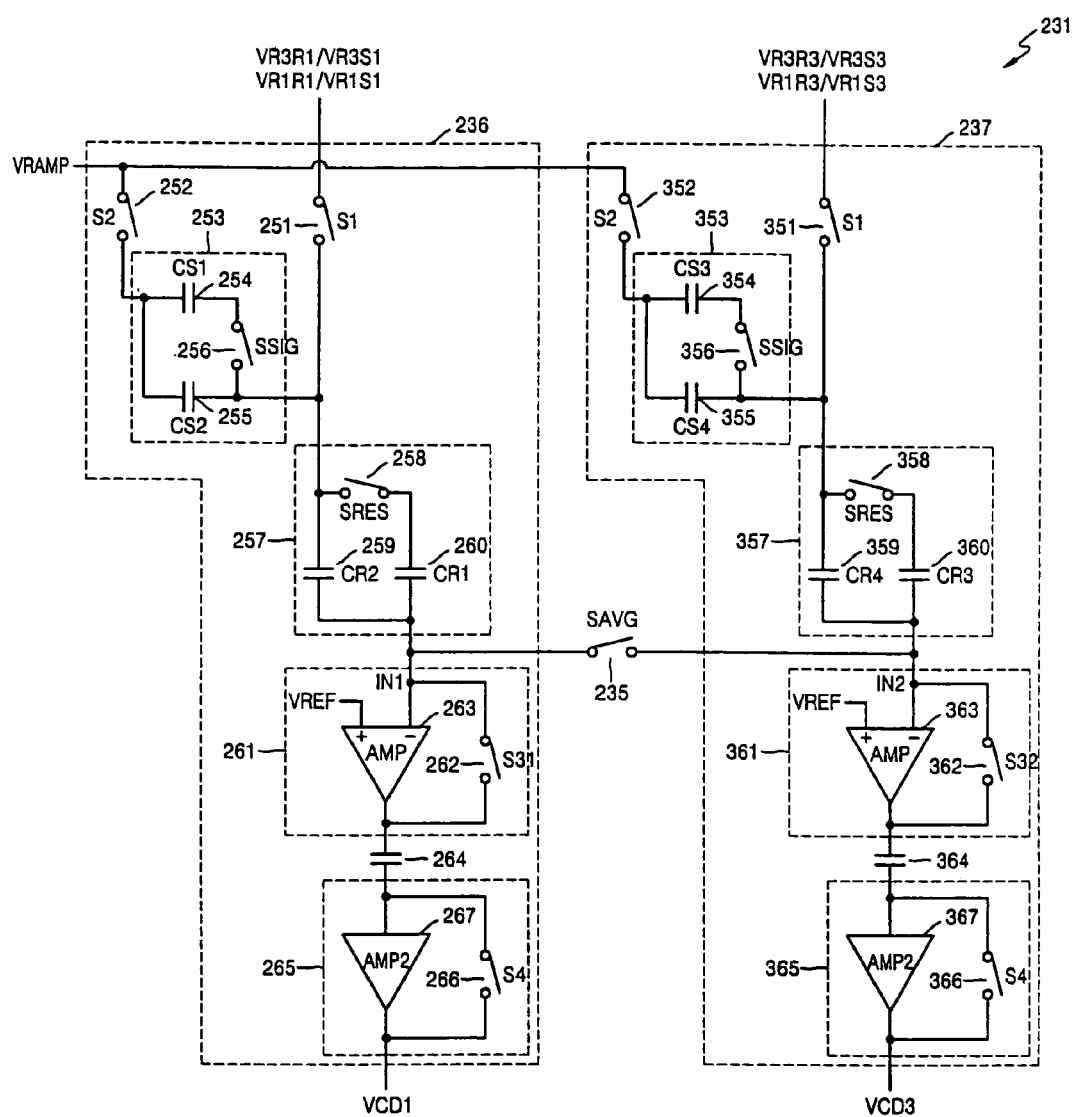
FIG. 14 is a circuit diagram of the CDS circuits of FIG. 13.

FIG. 14 is a circuit diagram of the CDS circuits 236 and 237 of FIG. 13. Referring to FIG. 14, the first CDS circuit 236 includes a second switch 251, a third switch 252, a first video signal averaging unit 253, a first reset signal averaging unit 257, a first comparator, a first capacitor 264, and a first amplifier 265. The first and second CDS circuits 236 have symmetrical structures. The second CDS circuit 237 includes a fourth switch 351, a fifth switch 352, a second video signal averaging unit 353, a second reset signal averaging unit 357, a second comparator, a second capacitor 364, and a second amplifier 365.

The second switch 251 transfers the reset signals (VR1R1 and VR3R1 of odd-numbered rows, for example) and video signals (VR1S1 and VR3S1 of odd-numbered rows, for example) transmitted from the APS array 210 when short-circuited according to a control signal S1 generated by the controller (not shown). The third switch 252 transfers the lamp signal VRAMP when short-circuited according to a control signal S2 generated by the controller (not shown). The first video signal averaging unit 253 respectively averages video signals of two odd-numbered columns, video signals of two even-numbered columns, video signals of two odd-numbered rows and video signals of two even-numbered rows, which are transferred from the second switch 251 according to short-circuiting of the first switch 235. The first reset signal averaging unit 257 respectively averages reset signals of two odd-numbered columns, reset signals of two even-numbered columns, reset signals of two odd-numbered rows and reset signals of two even-numbered rows, which are transferred by the second switch 251 according to short-circuiting of the first switch 235. The first comparator 261 compares the voltage of a node IN1 with the reference voltage VREF when a voltage difference between the averaged reset signal and the averaged video signal at the node IN1 is increased in proportion to the ramp signal VRAMP, and outputs a signal having a pulse width in response to the compared result. The first capacitor 264 receives the output signal of the first capacitor 264 through one terminal thereof and transmits it to the other end thereof. The first amplifier 265 buffers and stabilizes the signal transmitted through the first capacitor 264 and outputs the signal as the first pulse width signal VCD1.

The operations of the fourth switch 351, fifth switch 352, second video signal averaging unit 353, second reset signal averaging unit 357, second comparator 361, second capacitor 364 and second amplifier 365 of the second CDS circuit 237 are identical to the operations of the second switch 251, third switch 252, first video signal averaging unit 253, first reset signal averaging unit 257, first comparator 261, first capacitor 264 and first amplifier 265 of the first CDS circuit 236 so that explanations therefore are omitted. The second CDS circuit 237 outputs the second pulse width signal VCD3 through the same process as the process through which the first CDS circuit 236 outputs the first pulse width signal VCD1.

Figure 15:
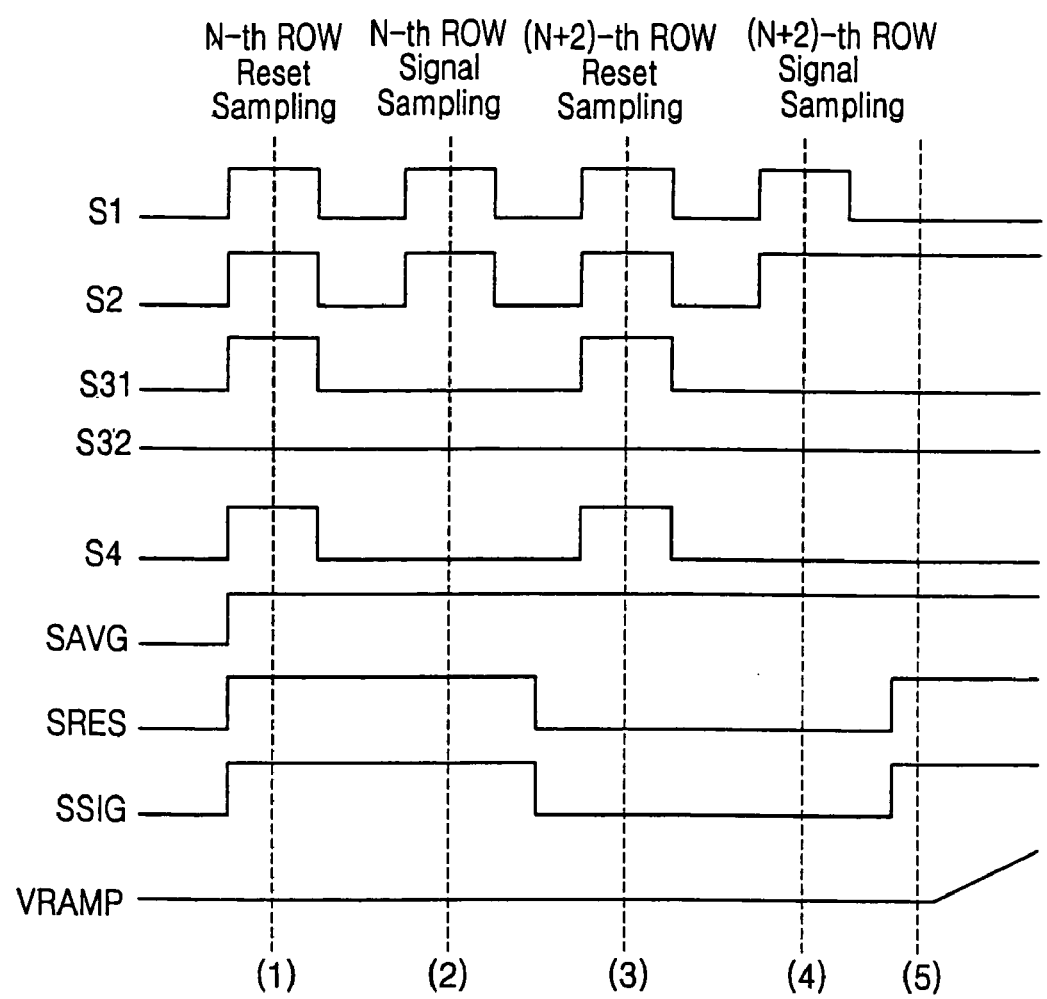
FIG. 15 is a timing diagram for explaining the operation of the circuit of FIG. 14.

FIG. 15 is a timing diagram for explaining the operations of the circuits of FIG. 14. The operations of the first and second CDS circuits 236 and 237 will now be explained in more detail with reference to FIG. 15. Assume that capacitances CS1, CS2, CS3 and CS4 of the capacitors 254, 255, 354 and 355 constructing the first and second video signal averaging units 253 and 263 have the same value and capacitances CR1, CR2, CR3 and CR4 of the capacitors 259, 260, 359 and 360 constructing the first and second reset signal averaging units 257 and 267 have the same value. In FIG. 14, VR1R1 and VR3R1 are reset signals of a column (the first column, for example) of two neighbouring odd-numbered rows (the first and third rows, for example) and VR1S1 and VR3S1 are video signals of a column (the first column, for example) of two neighbouring off-numbered rows (the first and third rows, for example). Furthermore, VR1R3 and VR3R3 are reset signals of a column (the third column, for example) of two neighbouring odd-numbered rows (the first and third rows, for example), which is adjacent to the column generating the VR1R1 and VR3R1, and VR1S3 and VR3S3 are video signals of a column (the third column, for example) of two neighbouring odd-numbered rows (the first and third rows, for example), which is adjacent to the column generating the VR1R1 and VR3R1. In FIG. 14, signals S1, S2, S31, S32, S4, SSIG and SRES for controlling the switches 251, 252, 262, 266, 256 and 258 or 351, 352, 362, 366, 356 and 358 are generated by a predetermined controller (not shown). Assume that the signals S1, S2, S31, S32, S4, SSIG and SRES short-circuit the switches 251, 252, 262, 266, 256 and 258 or 351, 352, 362, 366, 356 and 358 when activated from a first logic state (logic low state) into a second logic state (logic high state), as shown in FIG. 15.

On this assumption, during a period (1) of FIG. 15, the reset signals VR1R1 and VR1R3 of the first row are sampled while the first switch 235 is short-circuited. In the period (1), all the switches 251, 252, 262, 266, 256 and 258 or 351, 352, 362, 366, 356 and 358 are short-circuited, the reset signals VR1R1 and VR1R3 of the first row are averaged, and the relationship of Equation 17 is obtained.

$$Q_{CR1} = Q_{CR2} =$$
$$Q_{CR3} = Q_{CR4} \propto C_{R1,2,3,4}\left(\frac{VR1R1 + VR1R3}{2} - VREF\right)$$ [Equation 17]

Here, Q denotes the quantity of charges and $C_{R1,2,3,4}$ represents CR1, CR2, CR3 or CR4.

During a period (2) of FIG. 15, the video signals VR1S1 and VR1S3 of the first row are sampled. In the period (2), the switches 262, 266, 362 and 366 controlled by the signals S31 and S4 are opened, the video signals VR1S1 and VR1S3 are averaged, and the relationship of Equation 18 is obtained.

$$Q_{CS1} = Q_{CS2} =$$
$$Q_{CS3} = Q_{CS4} \propto C_{S1,2,3,4}\left(\frac{VR1S1 + VR1S3}{2} - VRAMP\right)$$ [Equation 18]

Here, Q denotes the quantity of charges and $C_{S1,2,3,4}$ represents CS1, CS2, CS3 or CS4.

During a period (3) of FIG. 15, the reset signals VR3R1 and VR3R3 of the third row are sampled. In this period, the switched 256, 258, 356 and 358 controlled by the signals SSIG and SRES are opened, the reset signals VR3R1 and VR3R3 of the third row are averaged, and the relationship of Equation 19 is obtained.

$$Q_{CR2} = Q_{CR4} \propto C_{R2,4}\left(\frac{VR3R1 + VR3R3}{2} - VREF\right)$$ [Equation 19]

Here, Q denotes the quantity of charges and $C_{R2,4}$ represents CR2 or CR4.

During a period (4) of FIG. 15, the video signals VR3S1 and VR3S3 of the third row. In this period, the switches 256, 258, 262, 266, 356, 358, 362 and 366 controlled by the signals SSIG, SRES, S31 and S4 are opened, the video signals VR3S1 and VR3S3 of the third row are averaged, and the relationship of Equation 20 is obtained.

$$Q_{CS2} = Q_{CS4} \propto C_{S2,4}\left(\frac{VR3S1 + VR3S3}{2} - VRAMP\right)$$ [Equation 20]

Here, Q denotes the quantity of charges and $C_{S2,4}$ represents CS2 or CS4.

During a period (5) of FIG. 15, the four video signals VR1S1, VR1S3, VR3S1 and VR3S3 of the first and third rows are averaged. In this period, the switches 256, 258, 356 and 358 controlled by the signals SSIG and SRES are short-circuited and the relationships of Equations 21 and 22 are obtained.

$$Q_{CR1} = Q_{CR2} = Q_{CR3} = Q_{CR4} \propto$$
$$C_{R1,2,3,4}\left(\frac{VR1R1 + VR1R3 + VR3R1 + VR3R3}{4} - VREF\right)$$ [Equation 21]

$$Q_{CS1} = Q_{CS2} = Q_{CS3} = Q_{CS4} \propto$$
$$C_{S1,2,3,4}\left(\frac{VR1S1 + VR1S3 + VR3S1 + VR3S3}{4} - VRAMP\right)$$ [Equation 22]

Figure 11:
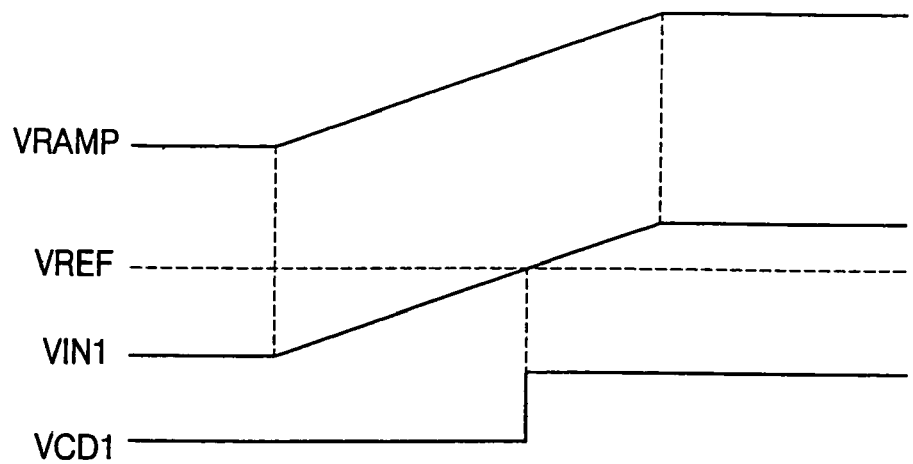
FIG. 11 is a diagram for explaining output timing of the analog averaging circuit in response to a video signal level.

Referring to FIG. 11, when the voltage difference VIN1 between the averaged reset signal (Equation 21) and the averaged video signal (Equation 22) is increased with the ramp signal VRAMP, the first and second comparators 261 and 271 of the first and second CDS circuits 236 and 237 generate the first pulse width signal VCD1 having a logic state varied in response to whether the voltage of the node IN1 is larger or smaller than the reference voltage VREF. In the sub-sampling mode for moving pictures, the switch 362 controlled by the control signal 32 is opened and the second comparator 361 and second amplifier 365 are not normally operated.

Accordingly, the counter 241 of FIG. 12 starts counting when the ramp signal VRAMP is increased and outputs a digital value corresponding to the count value, which is obtained when the logic state of the comparison signal VCD is varied, to the latch circuit 242. The latch circuit 242 stores the digital value received from the counter 241 and outputs the digital value as a digital signal corresponding to the difference between the averaged reset signal (Equation 21) and averaged video signal (Equation 22).

While the sub-sampling mode operation for reducing resolution of the circuit of FIG. 14 has been explained, the first switch 235 is opened in the still image mode and thus video signals sensed by the photodiodes of the APS array 210 are not averaged and both of the CDS circuits 236 and 237 generate separate normal first and second pulse width signals CDS1 and CDS2.

Figure 16:
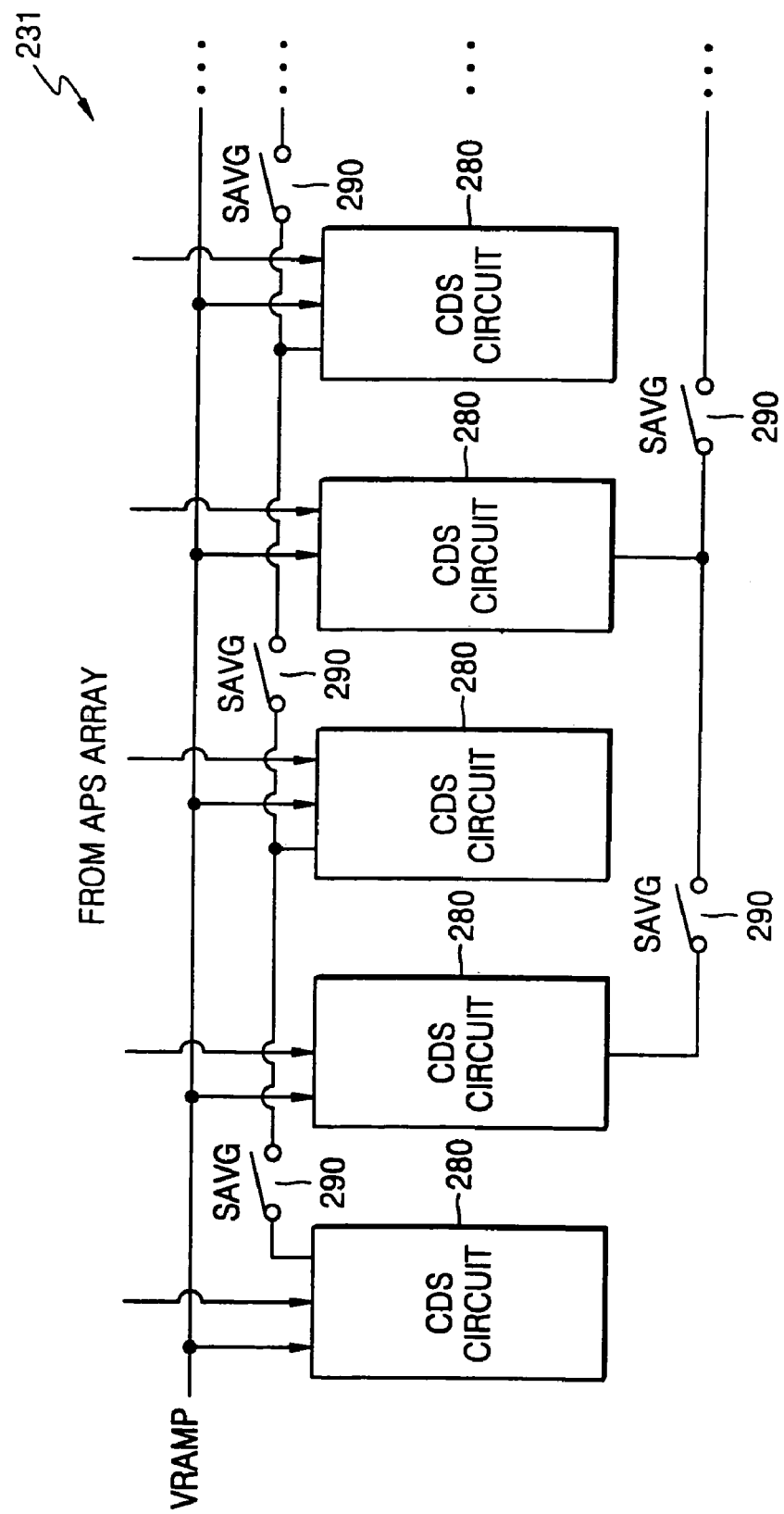
FIG. 16 illustrates a generalized one of the analog averaging circuit of FIG. 13.

For the sub-sampling mode operation for reducing resolution by 1/N, the analog averaging circuit 231 of FIG. 13 is modified into the circuit shown in FIG. 16. FIG. 16 is a block diagram of a generalized one of the analog averaging circuit 231 of FIG. 13. Referring to FIG. 16, the analog averaging circuit 231 includes N CDS circuits 280 operated in the same manner as the CDS circuits 236 and 237 of FIG. 13 are operated to respectively average N reset signals VRES and N video signals VSIG of each of odd-numbered columns, even-numbered columns, odd-numbered rows and even-numbered rows. The N CDS circuits 280 are connected by switches 290 controlled by a signal SAVG.

Figure 17:
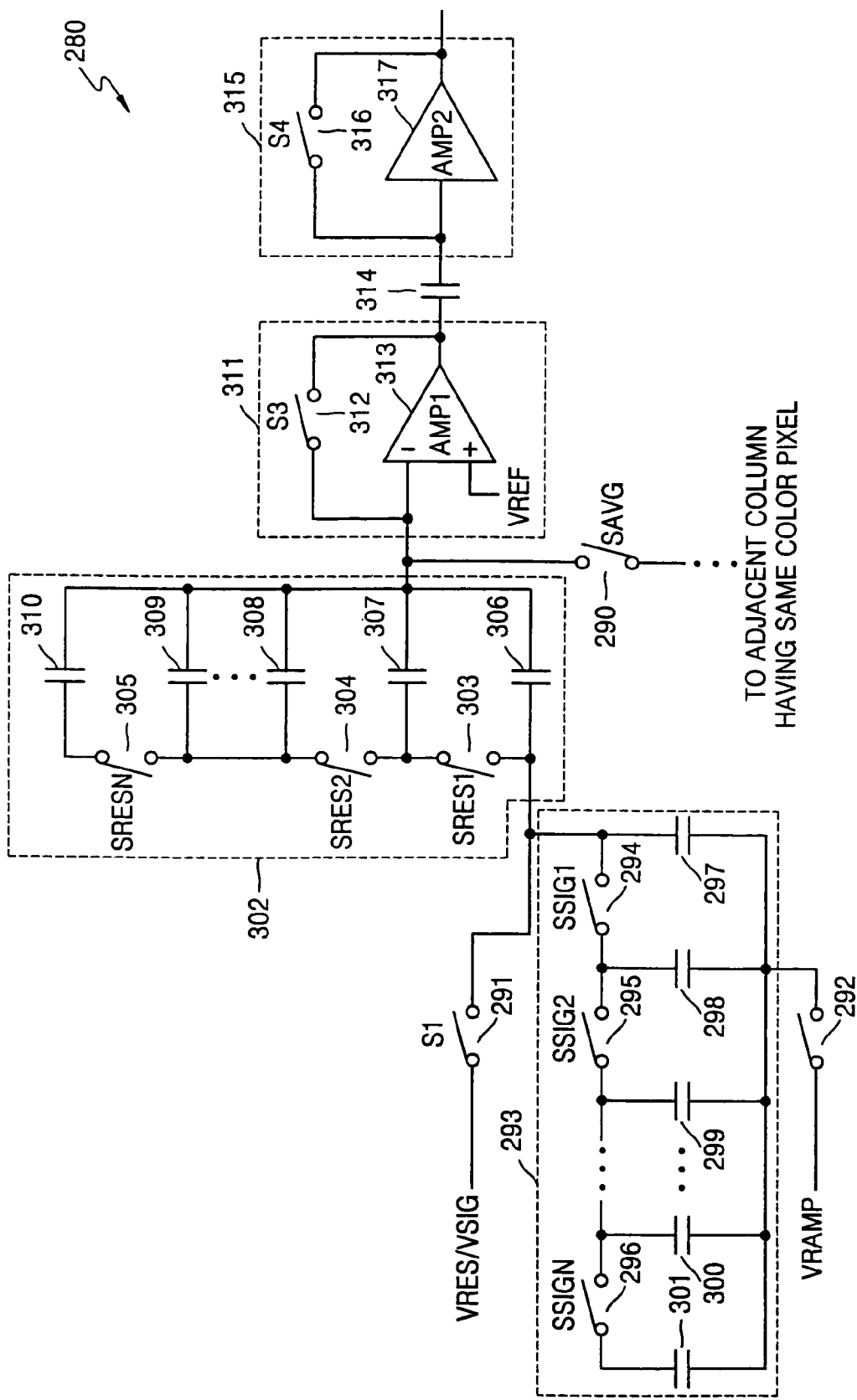
FIG. 17 is a circuit diagram of each CDS circuit of FIG. 16.

FIG. 17 is a circuit diagram of each of the CDS circuits 290 of FIG. 16. Referring to FIG. 17, the CDS circuit 290 has the same configuration as that of the circuit of FIG. 14. The CDS circuit 290 includes a sixth switch 291, a seventh switch 292, a third video signal averaging unit 293, a third reset signal averaging unit 302, a third comparator 311, a third capacitor 314, and a third amplifier 315. The operation of the CDS circuit 290 is similar to that of the circuit of FIG. 14 except that the third video signal averaging unit 293 and third reset signal averaging unit 302 respectively include N capacitors 297 through 301 and 306 through 310 for storing the reset signal VRES and video signal VSIG of each row. Right before the ramp signal VRAMP is increased, the capacitors 297 through 301 and 306 through 310 average N*N reset signals VRES and video signals VSIG because all the switches 294 through 296 and 303 through 305 are short-circuited. Detailed explanation for the circuit of FIG. 17 is omitted because those skilled in the art can understand the operation of the circuit of FIG. 17 from the explanation for the circuit of FIG. 14.

In the meantime, the analog-digital conversion unit 230 converts an analog signal corresponding to the difference between the averaged reset signal (Equation 21) and averaged video signal (Equation 22) into a digital signal, and a predetermined video signal processor following the analog-digital conversion unit 230 interpolates the digital signal and outputs it to a display such as LCD.

As described above, the CIS type solid-state image-sensing device 200 averages video signals in row and column directions from N rows through the analog averaging circuit 231 such that any photo-electric-converted video signal VSIG in every pixel of the APS array 210 is not discarded. The signal VCD output from the analog averaging circuit 231 is input to the digital signal output circuit 232 to be converted into a digital signal.

As described above, the CIS type solid-state image-sensing device according to the present invention can analog-average video signals output from pixels without having a large capacitor to carry out the sub-sampling mode operation for moving pictures. Accordingly, a CDS frequency can be decreased and a high frame rate for capturing a moving picture can be secured. Furthermore, a still image with high resolution can be captured and a moving picture can be captured with a low consumption power.

Furthermore, since video signals of every row and column are utilized without discarding any video signal in the sub-sampling mode operation, signal magnitudes are increased to improve the dynamic range of an output signal and zigzag noise appearing on a display is reduced. Thus, display quality can be enhanced when the solid-state image-sensing device of the present invention is applied to a mobile system such as a cellular phone and digital camera. Moreover, the solid-state image-sensing device of the present invention does not use a memory and thus a chip size is not increased because the device uses the analog averaging method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A solid-state image-sensing device comprising:
    an APS array in which pixels are arranged in a two-dimensional matrix and two pixels in a selected row, which have a distance corresponding to one column between them, respectively generate a first reset signal and first video signal and a second reset signal and second video signal in a sub-sampling mode operation;
    an averaging circuit that generates a signal in which an average of the first and second reset signals is reflected as an amplifier input signal, reflects the first and second video signals in the amplifier input signal to generate a signal corresponding to an average of a difference between the first reset signal and first video signal and a difference between the second reset signal and second video signal, and modulates the signal corresponding to the average into a pulse width signal in the sub-sampling mode operation; and
    a digital signal output circuit generating a digital signal having different digital values based on instants of time of changing the logic state of the pulse width signal.

2. The solid-state image-sensing unit as claimed in claim 1, wherein the averaging circuit comprises:
    CDS circuits respectively having predetermined amplifiers, each of the CDS circuits being included each column; and
    a switch short-circuiting input ports of the amplifiers having a distance corresponding to one column between them in the sub-sampling mode operation,
    wherein the amplifier input signal is generated at the short-circuited input ports.

3. The solid-state image-sensing device as claimed in claim 2, wherein only one of the CDS circuits, which has one of the amplifiers having a distance of one column between them, compares the signal corresponding to the average of the difference between the first reset signal and first video signal and the difference between the second reset signal and second video signal with a reference voltage to generate the pulse width signal.

4. The solid-state image-sensing device as claimed in claim 2, wherein the sub-sampling mode operation handles a moving picture.

5. The solid-state image-sensing device as claimed in claim 4, wherein the switch is opened in a still image mode operation, and each of the CDS circuits generates a signal corresponding to a difference between a reset signal and a video signal generated from a corresponding pixel of the column in which the corresponding CDS circuit included and modulates the generated signal into a signal having a pulse width in proportion to a magnitude of the received signal in the still image mode operation.

6. The solid-state image-sensing device as claimed in claim 1, wherein the APS array generates N reset signals and N video signals of columns having the same color in each of N rows, and the averaging circuit respectively averages the N reset signals and N video signals and modulates a difference between the averaged reset signal and the averaged video signal into a pulse width signal.

7. The solid-state image-sensing device as claimed in claim 6, wherein the averaging circuit comprises:
    a first switch;
    a first CDS circuit receiving the reset signals and video signals from one column of the pixel array to generate a corresponding averaged reset signal and averaged video signal according to short-circuiting of the first switch and generating a first pulse width signal using a ramp signal, the averaged reset signal and the averaged video signal; and
    a second CDS circuit receiving the reset signals and video signals from a column, which is adjacent to the column to which the first CDS circuit belongs and has the same color as that of the column to which the first CDS circuit belongs, to generate a corresponding averaged reset signal and averaged video signal according to short-circuiting of the first switch and generating a second pulse width signal using the ramp signal, the averaged reset signal and the averaged video signal, wherein the first switch is short-circuited in the sub-sampling mode operation.

8. The solid-state image-sensing device as claimed in claim 7, wherein the each of the first and second CDS circuits comprises:
   a second switch transferring the reset signals and video signals when short-circuited;
   a third switch transferring the ramp signal when short-circuited;
   a video signal averaging unit averaging the video signals transferred by the second switch according to short-circuiting of the first switch;
   a reset signal averaging unit averaging the reset signals transferred by the second switch according to short-circuiting of the first switch; and
   when a difference voltage between the averaged reset signal and the averaged video signal is increased with the ramp signal, a comparator generating the pulse width signal having a logic state varied in response to whether the increased voltage is larger or smaller than a reference voltage.

9. The solid-state image-sensing device as claimed in claim 8, wherein each of the first and second CDS circuits comprises:
   a capacitor receiving the pulse width signal through one terminal thereof and transmitting the pulse width signal to the other terminal thereof; and
   an amplifier buffering the pulse width signal transmitted through the capacitor and outputting the buffered signal.

10. The solid-state image-sensing device as claimed in claim 1, wherein the pulse width signal is proportional to a magnitude of the signal corresponding to the average of the difference between the first reset signal and first video signal and the difference between the second reset signal and second video signal.

11. The solid-state image-sensing device as claimed in claim 1, wherein the APS array further generates a third reset signal and third video signal and a fourth reset signal and fourth video signal from two pixels having a distance corresponding to one column between them, respectively, in the sub-sampling mode, and the averaging circuit reflects the third and fourth video signals in a corresponding amplifier input signal in which the third and fourth reset signals have been reflected to further generate a signal corresponding to an average of a difference between the third reset signal and third video signal and a difference between the fourth reset signal and fourth video signal and generates a pulse width signal corresponding to the generated signal.

12. The solid-state image-sensing device as claimed in claim 11, wherein the first and second video signals correspond to a first color signal, and the third and fourth video signals correspond to a second color signal.

13. The solid-state image-sensing device as claimed in claim 12, wherein the APS array generates the first and second video signals corresponding to the second color signal and generates the third and fourth video signals corresponding to a third color signal in a next selected row.

14. The solid-state image-sensing device as claimed in claim 13, wherein the first, second and third color signals construct Bayer pattern.

15. A method for driving a solid-state image-sensing device comprising:
   two pixels in a selected row, which have a distance corresponding to one column between them, respectively generating a first reset signal and first video signal and a second reset signal and second video signal in an APS array having pixels arranged in a two-dimensional matrix in a sub-sampling mode operation;
   reflecting the first and second video signals in an amplifier input signal in which the first and second reset signals have been reflected to generate a signal corresponding to an average of a difference between the first reset signal and first video signal and a difference between the second reset signal and second video signal, and modulating the signal corresponding to the average into a pulse width signal in the sub-sampling mode operation; and
   generating a digital signal having different digital values based on instants of time of changing the logic state of the pulse width signal.

16. The method for driving a solid-state image-sensing unit as claimed in claim 15, wherein input ports of two amplifiers, which have a distance corresponding to one column between them and respectively included in CDS circuits each of which is included in each column, are short-circuited to generate the amplifier input signal at the short-circuited input ports in the sub-sampling mode operation.

17. The method for driving a solid-state image-sensing device as claimed in claim 16, wherein only one of the CDS circuits, which has one of the two amplifiers having a distance of one column between them, compares the signal corresponding to the average of the difference between the first reset signal and first video signal and the difference between the second reset signal and second video signal with a reference voltage to generate the pulse width signal.

18. The method for driving a solid-state image-sensing device as claimed in claim 16, wherein the sub-sampling mode operation handles a moving picture.

19. The method for driving a solid-state image-sensing device as claimed in claim 18, wherein the input ports of the two amplifiers having the distance of one column between them are opened in a still image mode operation, and each of the CDS circuits generates a signal corresponding to a difference between a reset signal and a video signal generated from a corresponding pixel of the column in which the corresponding CDS circuit is included and modulates the generated signal into a signal having a pulse width in proportion to a magnitude of the received signal in the still image mode operation.

20. The method for driving a solid-state image-sensing device as claimed in claim 15, further comprising:
   generating N reset signals and N video signals of columns having the same color in each of N rows selected from the APS array; and
   respectively averaging the N reset signals and N video signals and modulating a difference between the averaged reset signal and the averaged video signal to generate a pulse width signal.

21. The method for driving a solid-state image-sensing device as claimed in claim 20, wherein the averaging the N reset signals and N video signals comprises:
   receiving the reset signals and video signals from one column of the pixel array to generate a corresponding averaged reset signal and averaged video signal according to short-circuiting of a predetermined switch; and
   receiving the reset signals and video signals from a column, which is adjacent to the column and has the same color as that of the column, to generate a corresponding averaged reset signal and averaged video signal according to short-circuiting of the predetermined switch,
   wherein the predetermined switch is short-circuited in the sub-sampling mode operation.

22. The method for driving a solid-state image-sensing device as claimed in claim 21, wherein the generating the pulse width signal comprises increasing a difference voltage between the averaged reset signal and the averaged video signal in response to a ramp signal, and the pulse width signal has a logic state varied in response to whether the increased voltage is larger or smaller than a reference voltage.

23. The method for driving a solid-state image-sensing device as claimed in claim 22, wherein the generating the pulse width signal further comprises:

receiving the pulse width signal through one terminal of a capacitor and transferring the pulse width signal to the other terminal of the capacitor; and buffering the pulse width signal transferred through the capacitor and outputting the buffered signal.

24. The method for driving a solid-state image-sensing device as claimed in claim 15, wherein the pulse width signal is proportional to a magnitude of the signal corresponding to the average of the difference between the first reset signal and first video signal and the difference between the second reset signal and second video signal.

25. The method for driving a solid-state image-sensing device as claimed in claim 15, further comprising:

two pixels having a distance corresponding to one column between them in the APS array respectively generating a third reset signal and third video signal and a fourth reset signal and fourth video signal in the sub-sampling mode; and reflecting the third and fourth video signals in a corresponding amplifier input signal in which the third and fourth reset signals have been reflected to generate a signal corresponding to an average of a difference between the third reset signal and third video signal and a difference between the fourth reset signal and fourth video signal and generating a pulse width signal corresponding to the generated signal.

26. The method for driving a solid-state image-sensing device as claimed in claim 25, wherein the first and second video signals correspond to a first color signal, and the third and fourth video signals correspond to a second color signal.

27. The method for driving a solid-state image-sensing device as claimed in claim 26, wherein the first and second video signals corresponding to the second color signal and the third and fourth video signals corresponding to a third color signal are generated in a next selected row of the APS array.

28. The method for driving a solid-state image-sensing device as claimed in claim 27, wherein the first, second and third color signals construct Bayer pattern.

* * * * *